Figure 1:
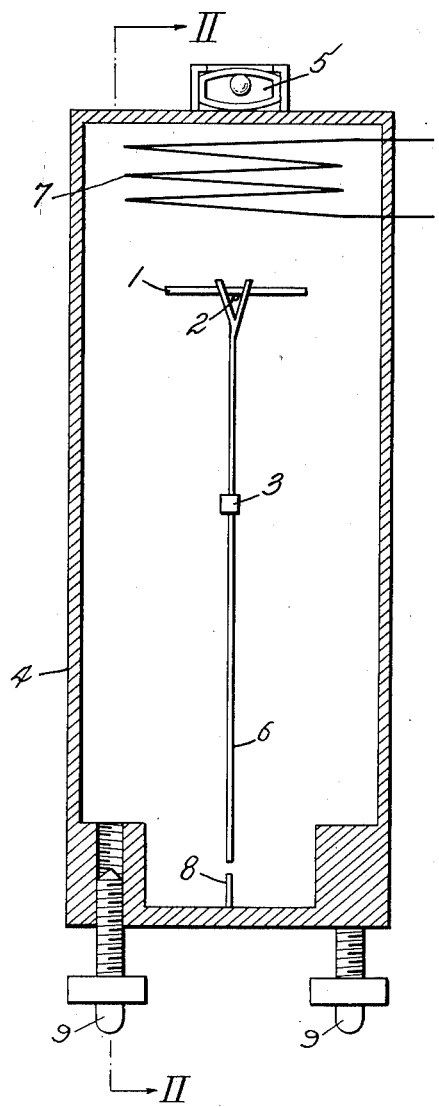

May 13, 1952      A. J. ARVELA      2,596,638

MAGNETIC VARIOMETER

Filed May 17, 1948

INVENTOR
AUKUSTI JEREMIAS ARVELA
BY Wenderoth, Lind & Ponack
ATTORNEYS

Patented May 13, 1952

2,596,638

UNITED STATES PATENT OFFICE 2,596,638

MAGNETIC VARIOMETER

Aukusti Jeremias Arvela, Leppavaara, Finland

Application May 17, 1948, Serial No. 27,569
In Finland June 11, 1947

3 Claims. (Cl. 175—183)

Different kinds of balance-like magnetic variometers used to determine the vertical component of the terrestrial magnetism are known. In them all the magnetic needle is journaled from above its gravity center either with point bearings or with a knife edge. The measuring is effected either by permitting the needle in the east-west position to gain equilibrium, at which the changes in the vertical components cause changes in the angle between the horizontal and the needle, which are measured, or by returning the needle with the compensating magnetic field to the horizontal, at which the changes in the vertical component require the same changes in the compensating magnetic field.

The point bearing instruments, for instance the Tibering inclination balances are fast, but in some cases the accuracy attained thereby is inadequate. The instruments operating with a knife edge, such as the Schmidt and la Cour balances are more accurate, but slower to use and sensitive to shocks which may occur in field work. Endeavours have also been made to construct magnetic torsion balances, but all the information obtained relates to instruments, which in operation give results with restricted use only.

The present invention renders possible the construction of an instrument, which gives an accurate result simply and quickly.

The present invention is characterized chiefly in that the permanent magnetic needle is attached to a thin horizontal torsional wire so, that the torsional force of the wire is partly or fully compensated.

This is achieved thereby that the magnetic needle is attached to the wire underneath its gravity center. When the magnetic needle is attached in the above-described manner to the elastic, horizontal wire, the center points of the cross-sections of the wire in the two planes, in which the wire breaks free of solid contact with the needle, must be considered as the static fulcrum points. The equilibrium established is either stable or unstable depending on how high the gravity center is raised. It is evident that a stable equilibrium must be used, but by regulating, with the aid of additional weights, the height of the gravity center smaller than that presupposed by the unstable equilibrium, the greatest possible sensitiveness is secured for the needle. By following this principle it is possible to construct an instrument, in which the angle between the needle and the horizontal can be read, as well as an instrument, in which the needle is returned with the compensating magnetic field to the horizontal level.

Torsional force can be compensated magnetically also. This is effected by placing in the instrument one or several solid auxiliary magnets, which cause the magnetic needle the more turning moment, the bigger the angle between the magnetic needle and the horizontal level is. As an example of the plurality of possibilities for placing the compensating magnet, mention is made of the fact that the rod-like compensating magnet can be placed on the extension of the needle's magnetic axis while the needle is in a horizontal position so, that the same named poles of the magnetic needle and the compensating magnet lie opposite.

Figure 2:
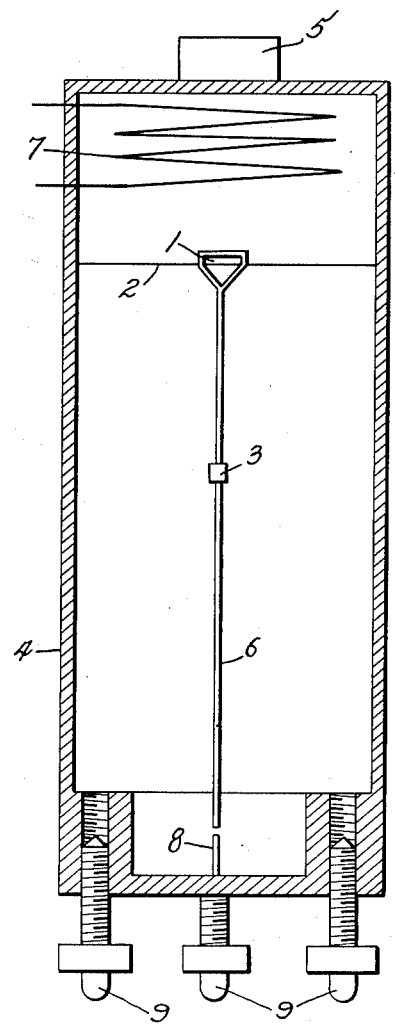

The invention will best be understood by reference to the drawings in which:

Fig. 1 is a vertical section of the variometer perpendicularly to the horizontal wire; and Fig. 2 is a section on the line II—II of Fig. 1.

The accompanying drawing illustrates a magnetic variometer according to the invention. To the skeleton 4 of the variometer is attached the torsional wire 2 from both ends thereof, and the levelling instrument 5, and the solenoid 7. A permanent magnet 1 provided with indicator 6 is attached to the torsional wire 2. The permanent magnet 1 is provided with transferable additional weights 3 with which the gravity center of the magnetic system is regulated with respect to the torsional wire 2. The variometer is provided with a gradated scale corresponding to the indicator 6 or with an index mark 8, and also with two or three regulating screws 9 for levelling purposes.

The variometer is used in the following manner: first it is levelled according to levelling instrument 5 by turning regulating screws 9; then into solenoid 7 is conducted a direct current so strong and of such direction that the magnetic field created twists the permanent magnet 1 into the horizontal plane, which is observed by the indicator 6 moving to index mark 8. Thus the variations in the vertical components of the terrestrial magnetic field are proportional to the variations in the intensity of the current conducted into the solenoid 7.

Having thus described my invention what is claimed as new is:

1. A magnetic variometer comprising a housing, a torsional wire horizontally secured in said housing, a permanent magnet attached to said torsional wire, an indicator suspended from said magnet and extending downwardly therefrom in said housing, a transferable weight attached to said indicator for regulating the gravity center of the magnetic system with respect to said torsional wire, said magnet having the gravity center thereof above the rotation axis of said wire, index means for coacting with said indicator, a solenoid in said housing above said magnet for twisting said magnet upon energization thereof into a horizontal plane, and auxiliary magnets arranged to provide an auxiliary magnetic field adapted to impart a turning moment to said magnet which is greater as the angle between the magnet and the horizontal plane is increased.

2. A magnetic variometer as claimed in claim 1, and wherein said auxiliary magnets comprising a solid compensating magnet of rod like dimensions placed on the extension of the magnetic axis of said magnet while said magnet is in a horizontal position, the corresponding poles of the magnet and the compensating magnet being oppositely arranged.

3. A magnetic variometer comprising a housing, a torsional wire horizontally secured in said housing, a permanent magnet attached to said torsional wire, an indicator suspended from and extending from said magnet, a transferable weight attached to said indicator for regulating the gravity center of the magnetic system with respect to said torsional wire, said magnet having the gravity center thereof above the rotation axis of said wire, index means for coacting with said indicator, electrically actuatable means in said housing above said magnet for twisting said magnet upon energization thereof into a horizontal plane, and auxiliary magnets arranged to provide an auxiliary magnetic field adapted to impart a turning moment to said magnet which is greater as the angle between the magnet and the horizontal plane is increased.

AUKUSTI JEREMIAS ARVELA.

REFERENCES CITED

The following references are of record in the file of this patent:

UNITED STATES PATENTS

| Number | Name | Date |
|---|---|---|
| 1,909,619 | Herrick | May 16, 1933 |
| 1,943,850 | Truman | Jan. 16, 1934 |
| 1,951,716 | Varian | Mar. 20, 1934 |
| 1,976,636 | Roux | Oct. 9, 1934 |
| 2,151,627 | Vacquier | Mar. 21, 1939 |
| 2,416,344 | Pauling | Feb. 25, 1947 |
| 2,436,039 | Fay | Feb. 17, 1948 |
| 2,487,047 | Farnham | Nov. 8, 1949 |